United States Patent
Keller

(10) Patent No.: US 10,417,854 B2
(45) Date of Patent: *Sep. 17, 2019

(54) SYSTEM AND METHOD PROVIDING ENHANCED SECURITY BALLOT IMAGE RECORDS

(71) Applicant: James McNeel Keller, Wimberley, TX (US)

(72) Inventor: James McNeel Keller, Wimberley, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/878,609

(22) Filed: Jan. 24, 2018

(65) Prior Publication Data
US 2018/0165905 A1  Jun. 14, 2018

Related U.S. Application Data

(63) Continuation-in-part of application No. 15/361,439, filed on Nov. 27, 2016, now Pat. No. 10,019,862.

(60) Provisional application No. 62/373,480, filed on Aug. 11, 2016, provisional application No. 62/371,330, filed on Aug. 5, 2016, provisional application No. 62/365,136, filed on Jul. 21, 2016.

(51) Int. Cl.
| | |
|---|---|
| G07C 13/00 | (2006.01) |
| G07C 13/02 | (2006.01) |
| H04N 7/18 | (2006.01) |
| G06Q 90/00 | (2006.01) |
| G06F 16/51 | (2019.01) |

(52) U.S. Cl.
CPC ............ *G07C 13/02* (2013.01); *G06Q 90/00* (2013.01); *G07C 13/00* (2013.01); *H04N 7/183* (2013.01); *G06F 16/51* (2019.01); *G06Q 2230/00* (2013.01)

(58) Field of Classification Search
CPC ...................................................... G07C 13/00
USPC ........................................................ 235/386
See application file for complete search history.

(56) References Cited

U.S. PATENT DOCUMENTS

| | | |
|---|---|---|
| 6,688,517 B1 | 2/2004 | McClure |
| 8,162,214 B1 | 4/2012 | Malatesta |
| | (Continued) | |

FOREIGN PATENT DOCUMENTS

KR   2010 0082649   7/2010

*Primary Examiner* — Jamara A Franklin
(74) *Attorney, Agent, or Firm* — Albert Peter Durigon

(57) ABSTRACT

The system and method providing enhanced security ballot image records of the present invention includes an enhanced security ballot image tabulator and an enhanced security ballot image audit station. The tabulator processes each ballot of a plurality of ballots to be tabulated to provide an enhanced security ballot image record having diachronically and synchronically coordinated enhanced security ballot image files. The enhanced security ballot image record may be broadcast upon completion of tabulation and/or simulcast real time during tabulation or otherwise provided to the public or other parties interested in the tabulation of cast votes. The enhanced security audit station receives the enhanced security ballot image record and analyzes it to selectively identify out-of-bounds diachronic and/or synchronic security parameters. Any identified ballots may then be reviewed by election officials or other interested parties for validity and authentication purposes. The tabulator may also produce images of the voter sign-in sheets.

10 Claims, 6 Drawing Sheets

(56) References Cited

U.S. PATENT DOCUMENTS 8,353,453 B2* 1/2013 Lee .................. G06Q 10/00
235/385
2009/0256703 A1 10/2009 Bolton

* cited by examiner

SYSTEM AND METHOD PROVIDING ENHANCED SECURITY BALLOT IMAGE RECORDS

CROSS-REFERENCE TO RELATED APPLICATIONS

This invention is a continuation-in-part application of co-pending U.S. utility patent application Ser. No. 15/361,439 filed Nov. 27, 2016 which U.S. utility patent application Ser. No. 15/361,439 filed Nov. 27, 2016 claims priority to U.S. provisional application Ser. No. 62/373,480, entitled Enhanced Security Ballot Tabulation Device and Enhanced Ballot Counting Security, filed Aug. 11, 2016; to U.S. provisional application Ser. No. 62/371,330 entitled Enhanced Security Ballot Tabulation Device and Enhanced Ballot Counting Security, filed Aug. 5, 2016; and to U.S. provisional application Ser. No. 62/365,136, entitled Enhanced Security Ballot Tabulation Device, filed Jul. 21, 2016, each of which is of the same inventive entity as herein and incorporated herein by reference.

FIELD OF THE INVENTION

This invention is drawn to the field of voting systems utilizing ballot images, more particularly, to audit security in voting systems utilizing ballot images, and still more particularly, to a novel system and method providing enhanced security ballot image records.

BACKGROUND OF THE INVENTION

Liberty in its free expression in votes cast is the presupposition that makes democratic political process possible in both the public and private electoral spheres. The confidence of the electorate depends on both the impartiality and the accuracy of the vote count. Factions may arise with significant interests that may be perceived to be at odds with the popular will. The less the cast ballots can be tampered with, the more the votes cast result will be seen as impartial and the greater the confidence the electorate will have in the results of any given election.

Representative of the heretofore known voting systems utilizing ballot images are U.S. Pat. No. 8,913,787 issued Dec. 16, 2014 to Hoover et al. and U.S. Pat. No. 8,864,026 issued Oct. 21, 2014 to Coomer et al., each incorporated herein by reference. The ballot images of Coomer are provided with unique ballot identification indicia, polling station identification indicia and poll worker identification indicia for ballot image verification and authentication in the event of an audit. In Hoover, the ballot images include an election official area which may be used by election officials to validate each particular ballot such as by signing the ballot by placing initials in an area provided therefor on the corresponding ballot.

In close or contested elections, it may become necessary to produce and audit the ballot images to verify the authenticity of the ballots that were cast in tangible form such as paper ballots. However, the audit security of the heretofore known voting systems utilizing ballot images has been subject to compromise due to the unavailability of voting records from loss or corruption; due to ballot insertions and/or ballot tampering; and/or due to suspicion that the intent of the electorate has not been honored.

SUMMARY OF THE INVENTION

One object of the present invention is to reduce if not eliminate audit insecurity due to the unavailability of records from loss or corruption. In accord therewith, the present invention discloses an enhanced security ballot image tabulator providing an enhanced security ballot image record representative of corresponding ones of a plurality of ballots tabulated thereby, that fixes it in a tangible, publically accessible preferably secure medium and/or broadcasts the enhanced security ballot image record in real time and/or otherwise makes it available for the public to individually and/or collectively review, validate and to authenticate.

Ballot images or other files that are broadcast or otherwise made available to the public may be in a format that is viewable and browsable by citizens or others with access to computers and internet or monitors with video feed. A format is chosen to enable legibility, at an image/frame rate to match the tabulation rate of the tabulator, or the bandwidth constraints of the broadcast means.

Another object of the present invention is to reduce if not eliminate audit insecurity due to election results that may have been compromised by ballot insertions and/or ballot tampering. In accord therewith, the present invention discloses an enhanced security serial ballot image tabulator tabulating a plurality of ballots providing a serial ballot image record of enhanced security diachronically and synchronically coordinated ballot image files each representative of corresponding ones of the plurality of ballots serially tabulated thereby.

Ballot image files are time and date stamped at their tabulation moment.

Ballot image files include the ballot number, ballots being locatable within the series for example by search for a ballot's ballot number.

Ballot image files include a locator number that is their order within the series, such as a video frame number.

Ballot image files include the running tabulation at any given ballot in the series of ballots being tabulated. Voter marks are detected and read and a running tabulation is appended to each ballot image file for each race field, including a highlight that may be provided to indicate a change in the number from the previous tabulation (previous ballot image) in the series.

A photograph of the environment of the tabulation device may be recorded at the time of each ballot image capture and tabulation.

A further object of the present invention is to reduce if not eliminate audit insecurity due to the suspicion that the intent of the electorate is not being honored in close or contested elections. In accord therewith, the present invention discloses an enhanced security ballot image audit station that receives said enhanced security ballot image record, and among other things, selectively determines whether ballot images have out-of-bounds diachronic and/or synchronic security parameters and/or other security parameters and flags for authentication and possible invalidation the corresponding ballots whose ballot images are not diachronically and/or synchronically coordinated or are otherwise out-of-bounds.

While a citizen auditor for example may capture the stream of files in real time as the tabulation is being broadcast, the viewing of the resulting video file is enabled at a single frame rate or through targeted searches to examine various races or anomalies.

A browser application including means for isolating individual races and presenting the voter marks for close scrutiny preferably may be provided, along with the running tabulation and ballot number as a visual field spread-sheet or column, so as to allow the rapid evaluation of how the machine read and tallied the vote as compared to the auditor's interpretation while studying the data supplied to the public.

A random ballots sample may be pulled from the stack after tabulation, and their ballot numbers looked up on the resulting ballot image file and the marked votes are compared between the hard copy and the image files, to detect substitution ballots.

Those who did vote can search the ballot image series file for their own ballot serial number (which they for example recorded while in the ballot booth, and took with them for later verification) and verify that the marks on the ballot of record are in fact the marks they made, and were tabulated correctly, and that their vote was added to the tally from the previous ballot, and was carried over to the following ballot.

The tabulation speed, as evidenced by the time and date stamp interval (indicating the effective ballots per second) may be compared to the known limit of the tabulation device.

The environment of the device at the time of a given ballot's tabulation may be viewed, so as to provide information as to time and place and personnel and activity in the vicinity of the equipment, potentially disclosing a scene that does not fit the time and facts that should correlate with the moment.

BRIEF DESCRIPTION OF THE DRAWINGS

These and other objects, advantageous aspects and inventive features of the present invention will become apparent as the invention becomes better understood by referring to the following, solely exemplary, detailed description of the presently preferred embodiments, and to the drawings, wherein.

DETAILED DESCRIPTION OF THE PRESENTLY PREFERRED EMBODIMENTS

Figure 1:
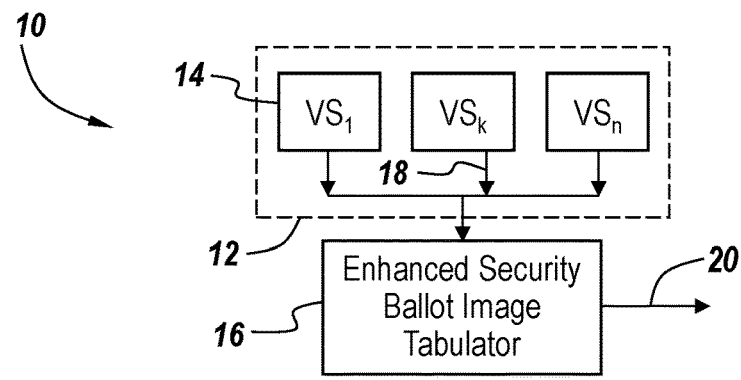
FIG. 1 is a pictorial diagram useful in explaining the manner of use of an enhanced security ballot image tabulator in accord with the system and method providing enhanced security ballot image records of the present invention.

Referring now to FIG. 1, generally designated at 10 is a pictorial diagram useful in explaining the manner of use of an enhanced security ballot image tabulator in accord with the system and method providing enhanced security ballot image records of the present invention. A polling place is schematically illustrated by dashed box 12. The polling place 12 may be governmental such as a state election precinct or may be non-governmental such as a corporation or other organization or other body where offices or matters are to be democratically decided by voting. The polling place 12 includes one or more voting stations 14 designated "VSl, VSk and VSn." The polling place 12 may include any voting machine adapted to receive a paper ballot having the races and matters to be voted on such as voting machines utilizing paper ballots and/or any voting machine adapted to electronically display a ballot image having the races and matters to be voted on, to record the votes cast for the races or matters listed on the electronic ballot, and a printer or other means or method for providing tangible ballots representative of the ballot images having any votes cast thereon.

An enhanced security ballot image tabulator 16 to be described that may be located in the polling place 12 receives each of a plurality of ballots to be tabulated schematically illustrated by arrow 18 from the one or more voting stations 14 and tabulates them in a manner to be described to provide an enhanced security ballot image record schematically illustrated by arrow 20. As appears more fully herein, the enhanced security ballot image record 20, constituted by a plurality of diachronically and synchronically coordinated ballot image files, may be stored preferably in secure media for later review in the case of a contested election or by interested parties and/or broadcast during or after tabulation is completed for real time or post-tabulation review by election officials, the electorate or other interested parties. As will be readily appreciated, the original paper or other tangible ballots are securely archived with a proper chain of custody.

If more than one tabulator is employed, a tabulator serial number or other parameter may be used to identify each tabulator and to distinguish their respective enhanced security ballot image records from those of the other tabulators.

Figure 2:
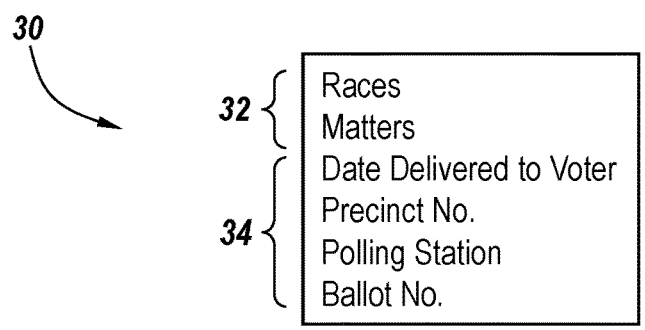
FIG. 2 is a schematic pictorial view of a typical prior art ballot for an exemplary governmental election.

Referring now to FIG. 2, generally designated at 30 is a schematic pictorial view of a typical prior art ballot. As shown, the ballot 30 includes races, matters that are listed for decision by the electorate, as schematically illustrated by bracket 32, as well as ballot validation information, including the date the ballot was delivered to the voter, the precinct number, the polling station, and a preprinted ballot number, all as schematically illustrated by bracket 34.

Figure 3:
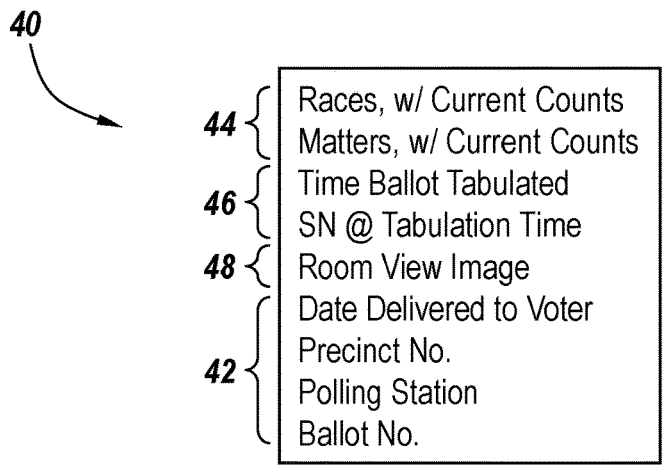
FIG. 3 is a schematic pictorial view of a ballot image of the same ballot as in FIG. 2 to include information tabulated in accord with the enhanced security ballot image tabulator of the system and method providing enhanced security ballot image records in accord with the present invention.

Referring now to FIG. 3, generally designated at 40 is a schematic pictorial view of a ballot image of the same ballot as in FIG. 2 to include information tabulated in accord with the enhanced security ballot image tabulator of the system and method providing enhanced security ballot image records of the present invention. As appears more fully below, the tabulator serially processes each of the plurality of ballots to be tabulated and generates, for each serially processed ballot, enhanced security diachronic and synchronic parameters.

As shown, the ballot image 40 has ballot validation information, including the date the ballot was delivered to the voter, the precinct number, the polling station, and the preprinted ballot serial number, as schematically illustrated by bracket 42, as does the ballot 30 of FIG. 2, but in addition thereto, the ballot image 40 has first tabulator-generated diachronic security parameter information to be described representative of the current counts for races and/or matters, as schematically illustrated by bracket 44; second tabulator-generated diachronic security parameter information to be described representative of the unique time and date it was serially processed; third tabulator-generated diachronic security parameter information to be described representative of its serial number at the time of tabulation, as schematically illustrated by bracket 46, and at least one synchronic security parameter information to be described, preferably a room view image, synchronous with each ballot being serially tabulated as schematically illustrated by bracket 48.

It will be appreciated by those of skill in the art the enhanced security ballot image tabulator may employ other diachronic security parameters intrinsic to the serial tabulation of the serially processed ballots of the plurality of ballots to be tabulated and may employ other synchronic security parameters extrinsic of and synchronous with the serial tabulation of each of the serially processed ballots of the plurality of ballots to be tabulated thereby without departing from the inventive concepts.

Figure 4:
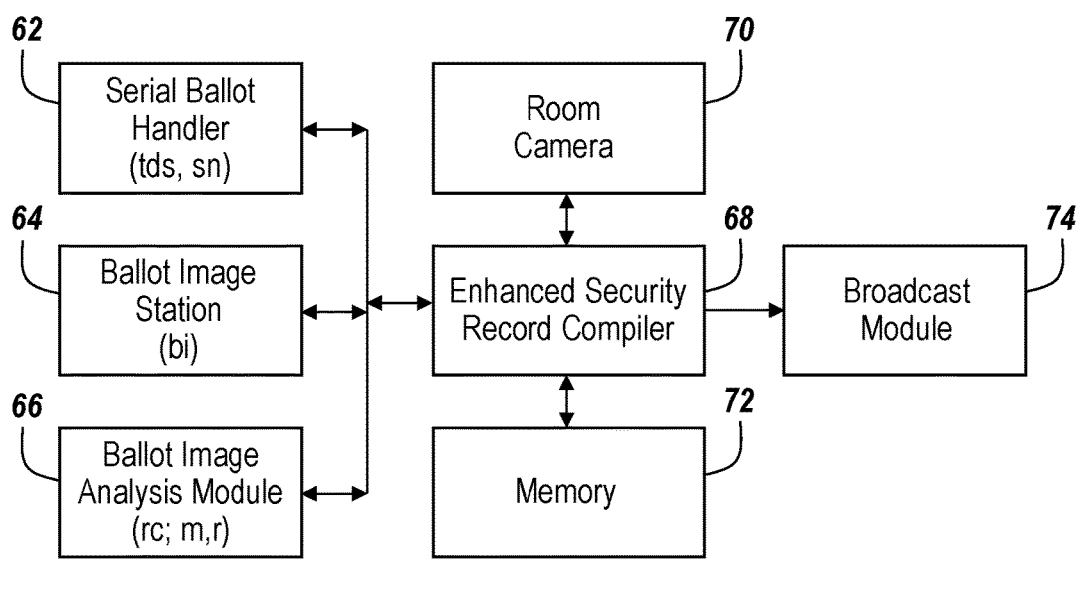
FIG. 4 is a functional block diagram of an enhanced security ballot image tabulator of the system and method providing enhanced security ballot image records in accord with the present invention.

Referring now to FIG. 4, generally designated at 60 is a functional block diagram of an enhanced security ballot image tabulator in accord with the system and method providing enhanced security ballot image records of the present invention. The tabulator 60 includes a serial ballot handler 62. The serial ballot handler 62 may be a mechanical device adapted to receive paper or other tangible ballots to be tabulated and to serially process them thereinthrough on a particular day and at a certain time at a feed rate, each with another serially increasing tabulator-generated number, respectively designated "tds" and "sn." "Tds" stands for "time date stamp" and is a diachronic parameter representative of the exact time of tabulation of each serially processed ballot and it will be a number that is its unique time and date stamp. "Sn" stands for "serial number" and is a diachronic parameter representative of the tabulator-generated serial number and it will be a number that increases by one (1) or other predetermined number with each successive ballot tabulated, which may be a frame number in the case of a video imaging format or a page number in the case of a serial image format, such as PowerPoint. For example, if the handler's feed rate is ten (10) ballots per second, the serially increasing tabulator-generated serial number uniquely associated with each serially processed paper ballot would be a magnitude increasing by one (1) every one tenth (1/10) of a second.

In some broadcast embodiments described herein, the ongoing tabulation may be simulcast in real time for public review. In these embodiments, a video formatting frame rate is selected so as not to exceed the limitations of the feed rate. For example, the video format frame rate would be less than or equal to the feed rate so as to not generate more than one video frame for each serially processed ballot.

A ballot image station 64 is operatively coupled to the serial ballot handler 62. The ballot image station 64 may be a video or still camera or a digital scanner or other means adapted to receive from the serial ballot handler 62 each ballot, not shown, of the series of ballots to be tabulated and for each ballot to make a true image thereof designated "bi," each at another tabulator-generated time and date stamp ("tds") and corresponding tabulator-generated serial number ("sn").

A higher resolution image of each ballot may be recorded simultaneously by the same camera or scanner or other imaging device, at a higher resolution than the video resolution provided to the public. Such a high resolution image may be useful in later adjudicating ambiguous vote marks.

The functions of the serial ballot handler module 62 and ballot image station 64 may, for example, be included in a single module, such as a paper scanning device.

A ballot image analysis module 66 is operatively coupled to the ballot image station 64. The ballot image analyzer may include an OCR device or other means adapted to recognize which races and matters have cast votes from each ballot image that respectively corresponds to another one of the ballots to be tabulated and may include software or other means adapted to tabulate a cumulative running count of the cast votes maintained current with each ballot image corresponding to another one of the plurality of ballots to be tabulated for each race and matter designated "rc; m,r." The designation "rc; m,r" stands for "running count; matters and races."

Although the parameters "tds" and "sn" are associated with the handler module 62, and the "rc; m, r" parameter is associated with the ballot image module 66, it will be appreciated these parameters can be produced in alternative embodiments by other modules without departing from the inventive concepts.

An enhanced security record compiler module 68 that may include a human input control interface device and/or a programmed controller or other control mechanism is operatively connected to the modules 62, 64, 66 and adapted to coordinate their operation to provide the enhanced security ballot image records to be described of the present invention.

A room camera 70 and a memory 72 are operatively connected to the record compiler module 68.

A broadcast module 74 is operatively coupled to the record compiler 68 that is adapted to simulcast the enhanced security ballot image files of the enhanced security ballot image record during tabulation for public view and/or broadcast the enhanced security ballot image record upon completion of tabulation.

Other means than or in addition to the room camera 70 to provide synchronic security parameters may be employed that may include a microphone providing an ambient soundtrack, compass information, G.P.S. data, barometric pressure, temperature, or other parameter that uniquely identifies each ballot with respect to an extrinsic, objectively valid data reference or datum. A fingerprint scanner may be among the inputs, and may also function as a scanning initiator for each batch of ballots entered into the tabulation device; it may also be the "start" button for the boot or the tabulation. The fingerprint data or image file may be stored as an appended file of the initial ballot, or incorporated into the enhanced ballot image file. Fingerprint data may be compared to room view image, and time sheets for election workers. An iris scanner, or galvanic skin response sensor, or a breathalyser, or other biometric measurement, could also be employed.

The memory 72 may be a secure write-once read-only memory.

Figure 5A:
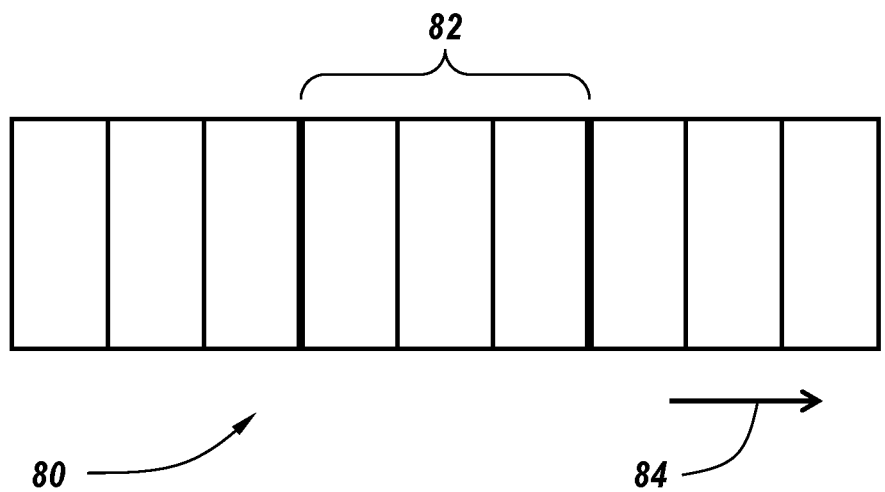
FIG. 5A is pictorial diagram schematically illustrating an enhanced security ballot image record of the enhanced security ballot image tabulator of the system and method providing enhanced security ballot image records in accord with the present invention.

Referring now to FIG. 5A, generally designated at 80 is pictorial diagram illustrating an enhanced security ballot image record of the enhanced security ballot image tabulator of the system and method providing enhanced security ballot image records in accord with the present invention. The enhanced security ballot image record 80 includes a plurality of constitutive enhanced security ballot image files schematically illustrated by bracket 82 each corresponding to another one of the ballots to be tabulated.

The constituent enhanced security ballot image files 82 of the enhanced security ballot image record 80 may be arranged into a sequential image viewing format, such as a video format, or PowerPoint type, so as to provide sequential viewing of its constitutive enhanced security ballot image files by a browser or other viewing application as schematically illustrated by an arrow 84.

The enhanced security ballot image record of the present invention presents information that is consistent with, and provided in parallel to, the printed "results tape" that may be required by law in various jurisdictions.

Figure 5B:
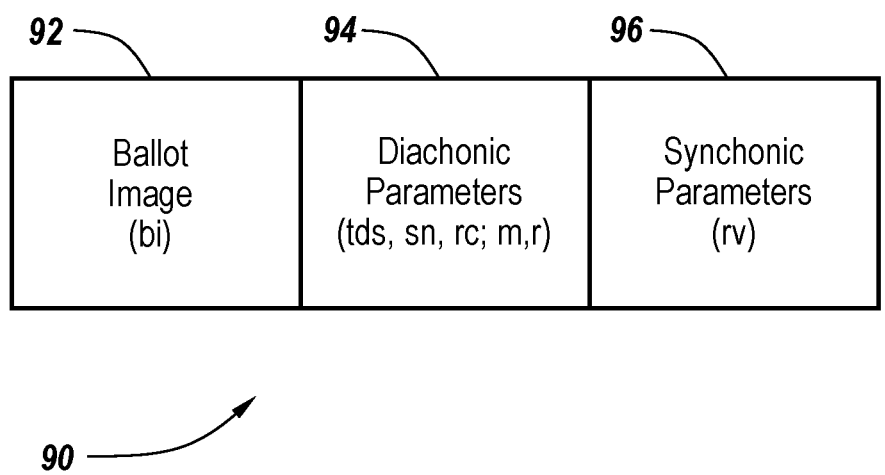
FIG. 5B is a pictorial diagram schematically illustrating an enhanced security ballot image file constitutive of the enhanced security ballot image record of the enhanced security ballot image tabulator of the system and method providing enhanced security ballot image records in accord with the present invention.

Referring now to FIG. 5B, generally designated at 90 is a pictorial diagram schematically illustrating an enhanced security ballot image file constitutive of the enhanced security ballot image record 80 (FIG. 5A) of the enhanced security ballot image tabulator of the system and method providing enhanced security ballot image records of the present invention. Each enhanced security ballot image file 90 corresponding to another one of the plurality of ballots to be tabulated includes its respective ballot image 92 designated "bi," its associated tabulator-generated diachronic security parameter 94 representative of its respective time and date stamp, designated "tds," its corresponding tabulator-generated serial number, designated "sn," its current tabulator-generated cumulative running votes cast count tabulation, designated "rc; m, r," for all races and/or matters, and its associated synchronic room view image security parameter 96, designated "rv," synchronous therewith.

The ballot images 92 and synchronous room view parameters 96 of each enhanced-security ballot image file 90 may be formatted as images, and the diachronic parameters 94 thereof may be formatted as images and/or data without departing from the inventive concepts.

As will be readily appreciated by those of skill in the art, the enhanced security ballot image record of constitutive diachronically and synchronically coordinated ballot image files one for each of the ballots to be tabulated provides a linked information network that makes it extremely difficult to tamper with the vote without detection, as the means of tampering entail having to fabricate content that is contextually linked to other data in the series that does not change, when the series of ballot images with the additional in-file data are viewed or analyzed as a series within the whole. Attempts to insert or delete ballots or alter or remove voter marks would require knowledge of the tally at the insertion point, and the alteration of every subsequent frame all the way to the last ballot. If the ballot images are broadcast in real time, or near real time as they are recorded, or if the poll workers and observers are provided with a digital copy of the ballot image series with running tabulations embedded in the images, subsequent efforts to alter the series are not possible without detection by quick comparison to these original records.

Figure 6:
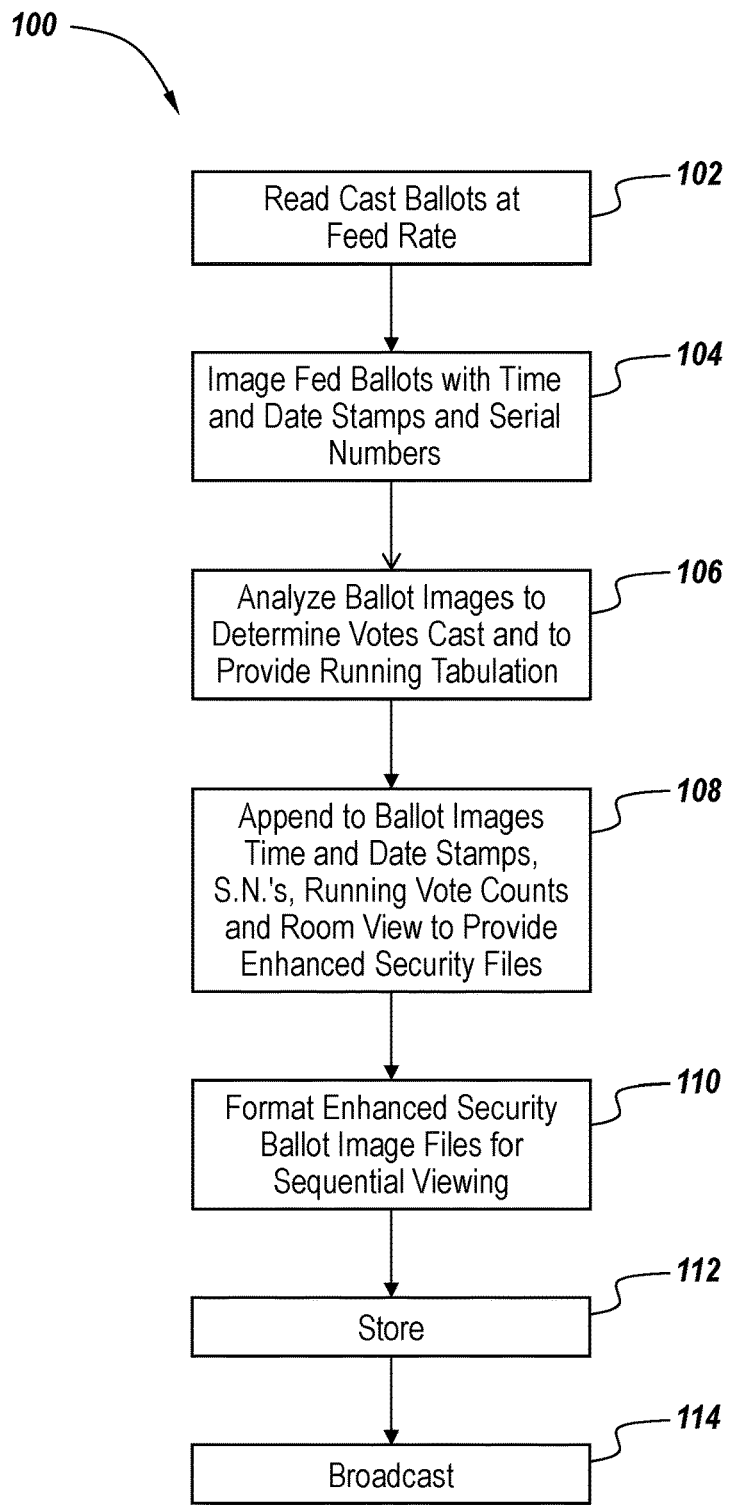
FIG. 6 is a block diagram useful in explaining the operation of the enhanced security ballot image tabulator of the system and method providing enhanced security ballot image records in accord with the present invention.

Referring now to FIG. 6, generally designated at 100 is a block diagram useful in explaining the operation of the enhanced security ballot image tabulator of the system and method providing enhanced security ballot image records in accord with the present invention.

As shown by a block 102, the ballots of the plurality of ballots to be tabulated are individually read at a tabulator feed rate, date and feed time.

As shown by a block 104, each ballot of the plurality of ballots to be tabulated is then imaged with corresponding tabulator-generated time and date stamps ("tds") and with tabulator-generated serial numbers ("sn").

As shown by a block 106, each ballot image respectively corresponding to individual ones of the plurality of ballots to be tabulated is then analyzed to detect cast votes for each race and matter and to serially provide a running tabulation thereof cumulative of all cast votes that is maintained current to each serially processed ballot image. For example, for the first fed ballot in the series of ballots being tabulated, a vote is cast for a certain candidate giving a running tabulation for that candidate of one (1) vote, at the moment the ballot is tabulated. For the second ballot in the series of ballots being tabulated, another vote is cast for the same candidate, and, associated with the second ballot, a running vote cast tabulation of two (2) for that candidate. In the third ballot, no vote is cast for that candidate and the running votes cast tabulation for that candidate is unchanged.

As shown by a block 108, an enhanced security ballot image file corresponding to individual ones of the plurality of ballots to be tabulated is then compiled that preferably includes its ballot image, its respective time and date stamp ("tds"), its tabulator-generated serial number ("sn")", its running cast votes tabulation ("rc; m, r"), and its room view image ("rv"), each for another one of the ballots of the plurality of serially tabulated ballots.

As shown by a block 110, an enhanced security ballot image record of all of the enhanced security ballot image files each corresponding to another one of the plurality of ballots to be tabulated is then compiled.

The enhanced security ballot image record may be formatted for sequential viewing of its constitutive enhanced security ballot image files in the case of an audit by election officials or review by the public or other interested parties. Any image browser capable of single frame viewing may be employed. To get the enhanced security ballot image record to the public in a timely manner, a standard resolution browser may be used. A video frame rate may be selected so as to match the capture or feed rate of the ballots in order that the bandwidth requirements for transmission and reception may be kept to a minimum, despite very high resolutions and consequently large ballot image individual file sizes which may be necessary in the case of a large ballot. The frame rate may be chosen so as to match the capture and processing rate, so as to reduce image compression and thereby improve resolution, so as to image the ballot legibly. The aspect ratio of ballots may be chosen so as to fit the image of the ballot into a standard video or other sequential image browsing format, while leaving a portion of the image frame blank, so as to allow space to include additional data and imagery in the same frame. The additional area may be alternatively located within the area of the ballot image, if the ballot includes a blank area suitably located or designated for that purpose. A data field may be created adjacent to each candidate's name or ballot initiative on the ballot for the purpose of a running tabulation.

A high resolution image of the entire ballot may be divided into smaller portions, so as to fit within the format limitations of the output format chosen, for the purpose of a lower resolution broadcast or other distribution to the public or other observers. For example, a large ballot requiring three thousand by two thousand (3000×2000) pixel resolution to record all the text and ballot marks at sufficient resolution to read clearly could be divided into four (4) quadrants of fifteen hundred by one thousand (1500×1000) pixels each, with each quadrant incorporated into a standard one thousand nine hundred twenty by one thousand eighty (1920×1080) video format, with room for appending image field for the time and data and additional information. Reformatting for other image formats or video formats may be accomplished so as to provide the most commonly viewable format within the constraints of the image size requirements, as well as changing standards and formatting, so as to provide for public audit of the ballot images and tally. If the ballot is intended to be recorded in this fashion, it's useful to further include the ballot number, date, precinct number etc. in each section of the ballot to be presented as a separate frame, so that original identifying information is preserved in every frame of output.

As shown by a block 112, the enhanced security ballot image record may then be stored upon compilation of each ballot image file corresponding to another serially processed ballot of the ballots to be tabulated and/or may be stored when compilation has been completed for all the enhanced security ballot image files of the ballots of the plurality of ballots to be tabulated. The record as stored may include metadata such as in Exchange image file format (Exif).

As shown by a block 114, the enhanced security ballot image record may then be broadcast when compilation has been completed for all ballots of the plurality of ballots to be tabulated after polls are closed and/or simulcast for public view upon compilation of each ballot image file individually corresponding to another ballot of the plurality of ballots to be tabulated as they are each processed serially at the time of tabulation after polls are closed.

The last enhanced ballot image in the series is the result; it shows the cumulative votes in all races. It may be printed out as a "final ballot and preliminary tally" in multiple copies, and signed by the election judge, then distributed with a CD or other secure media, along with a results tape, to the normal places; the judge keeps one, one goes to county/central count, a copy to each observer etc. That page is postable immediately on the internet as an image file. Also, at any point along the succession of ballots being tabulated, a frame may be copied and posted, showing the count at that point; this is useful in very large precincts where it takes a long time to feed all of the ballots, e.g., at ten (10) ballots per second, thirty thousand (30,000) votes would take fifty (50) minutes to tabulate. Some might like to see data points along the way, which would be available, without interrupting the tabulation, by pulling an enhanced security ballot image file out of the series, for publication. This serves a purpose similar to a "results tape" printout as is currently used, if provided in conjunction with the digital record. Results tapes currently may have a signature by the election judge at their terminus page.

Figure 7:
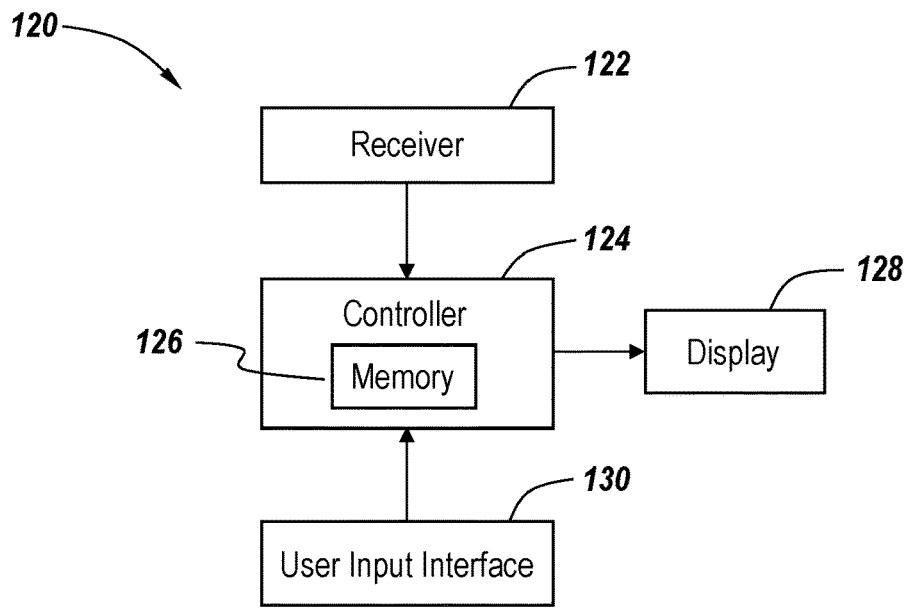
FIG. 7 is a functional block diagram of an enhanced security ballot image audit station for receiving and selectively reviewing enhanced security ballot image records of the system and method providing enhanced security ballot image records in accord with the present invention.

Referring now to FIG. 7, generally designated at 120 is a functional block diagram of an enhanced security ballot image audit station for receiving and selectively reviewing enhanced security ballot image records of the system and method providing enhanced security ballot image records in accord with the present invention useful among other things in the event of a contested election to identify possibly invalid ballots and or by members of the public or other parties interested in assuring themselves that the intent of the electorate is not being thwarted.

The audit station 120 includes a receiver 122. The receiver 122 may be a broadcast receiver, internet capable browser and/or among other things a secure memory device such as a secure flash drive adapted to receive the enhanced security ballot image records of the system and method providing enhanced security ballot image records of the present invention. A programmed controller 124 including a memory 126 is operatively connected to the receiver 122. The programmed controller 124 is adapted to receive the enhanced security ballot image records received by the receiver 122, to store it locally in the memory 126 and in response to user input control information, to look up individually selected ballot image files or other data and/or to scan the record to determine which enhanced security ballot image files constitutive of the enhanced security ballot image record may have out-of-bounds diachronic and/or synchronic security parameters, and/or to scan the record and/or files and/or data for other possible security parameter or other violations.

A display 128 that may display a web browser or other interface and a user input and control interface 130 that may include a keyboard and/or mouse are operatively connected to the programmed controller 124.

Figure 8:
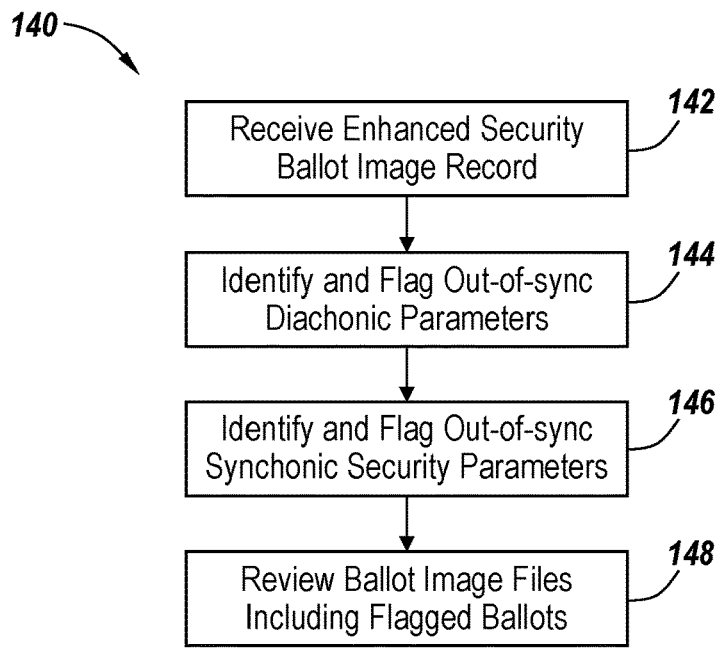
FIG. 8 is a block diagram useful in explaining the operation of the enhanced security ballot image audit station for receiving and reviewing enhanced security ballot image records of the system and method providing enhanced security ballot image records in accord with the present invention.

Referring now to FIG. 8, generally designated at 140 is a block diagram useful in explaining the operation of the enhanced security ballot image audit station for reviewing enhanced security ballot image records of the system and method providing enhanced security ballot image records in accord with the present invention.

As shown by a block 142, the enhanced security audit station receives the enhanced security ballot image record.

As shown by a block 144, the enhanced security audit station may be operated to select, identify and to flag out-of-bounds diachronic security parameters.

As shown by a block 146, the enhanced security audit station may be operated to select, identify and to flag out-of-bounds synchronic security parameters.

As shown by a block 148, the enhanced security audit station may be operated to review ballot images sequentially and/or to review ballot images corresponding to flagged ballot image files and/or to check for violations of other security or other parameters and/or to identify and view any selected ballot image, or area, field or race, or measure therein, including the view of a plurality of ballot image fields reformat into a spreadsheet, so as to facilitate the examination of selected races allowing viewing of large numbers of ballot images simultaneously.

With reference to FIGS. 9-12, different exemplary out-of-bounds diachronic and synchronic security parameters that are potentially detectable by the enhanced security ballot image audit station of the system and method providing enhanced security ballot image records in accord with the present invention will now be described. Other out-of-bounds diachronic security parameter violations, synchronic security parameter violations, diachronic/synchronic security violation parameters and/or other security parameter or other violations are possible without departing from the inventive concepts.

Figure 9:
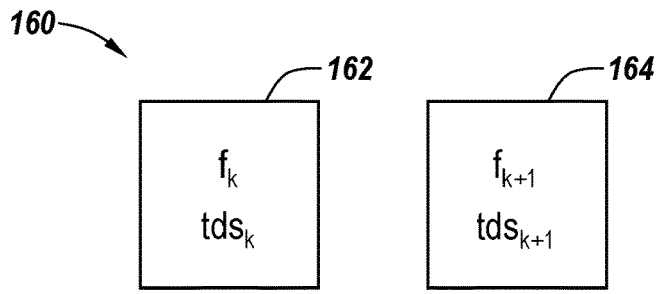
FIGS. 9-12 are schematic pictorial diagrams illustrating different exemplary out-of-bounds diachronic and synchronic security parameters that are potentially detectable by the enhanced security ballot image audit station of the system and method providing enhanced security ballot image records in accord with the present invention.

Referring now to FIG. 9, generally designated at 160 is a schematic pictorial diagram that illustrates an exemplary diachronic time out-of-sync condition. The boxes 162, 164 schematically represent successive ballot image files designated "fk, fk+1" bearing diachronic time of feed security parameters designated "tdsk, tdsk+1." An exemplary diachronic time out-of-sync parameter violation would be indicated for the corresponding ballot image files 162, 164 should the inverse of the time interval between successive time and date stamps be greater than the capture speed determined by the tabulator's maximum feed rate. In any contest, the corresponding out-of-sync ballot image files 162, 164 could be readily identified and audited for authentication and possible invalidation. For example, given a tabulator with a maximum feed rate of ten (10) ballots per second, the time interval of one twentieth (1/20) of a second between successive time and date stamps would indicate a feed rate that exceeds the tabulator's capacity.

Figure 10:
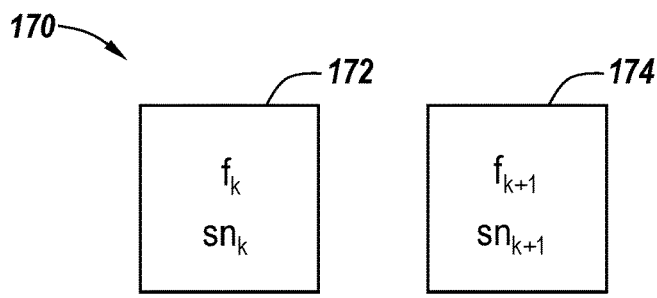

Referring now to FIG. 10, generally designated at 170 is a schematic pictorial diagram that illustrates an exemplary diachronic tabulator-generated serial number out-of-sync condition. The boxes 172, 174 schematically represent successive ballot image files "fk, fk+1" bearing diachronic tabulator-generated serial number security parameters designated "snk, snk+1." An exemplary diachronic tabulator-generated serial number out-of-sync parameter violation would be indicated for the corresponding ballot image files 172, 174 should the difference in serial numbers be other than one (1) or other predetermined serial increase parameter. In any contest, the corresponding out-of-sync ballot image files 172, 174 could be readily identified and audited for authentication and possible invalidation.

Figure 11:
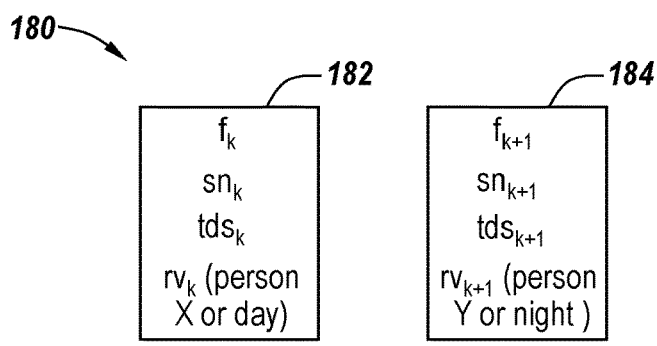

Referring now to FIG. 11, generally designated at 180 is a schematic pictorial diagram that illustrates an exemplary synchronic room view out-of-sync condition. The boxes 182, 184 schematically represent successive ballot image files designated "fk, fk+1," bearing successive diachronic serial number security parameters designated "snk, snk+1," bearing diachronic time and date stamp security parameters designated "tdsk, tdsk+1" and bearing synchronic room view security parameters respectively designated "rvk (person X or day)" and "rvk+1 (person Y or night)." An exemplary synchronic room view out-of-sync parameter violation would be indicated for the corresponding ballot image files 182, 184 should the difference in the people present or time of day in the corresponding synchronous room view images of successive enhanced security ballot image files unexplainably change relative to the time interval between successive time and date stamps. In any contest, the corresponding out-of-sync ballot image files 182, 184 could be audited for authentication and possible invalidation.

Figure 12:
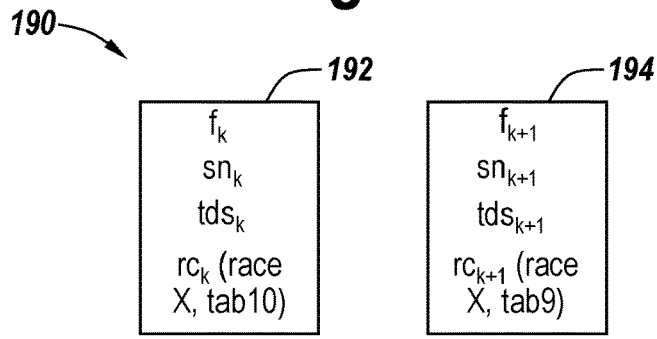

Referring now to FIG. 12, generally designated at 190 is a schematic pictorial diagram that illustrates another exemplary diachronic running vote count tabulation out-of-sync condition. The boxes 192, 194 schematically represent successive ballot image files designated "fk, fk+1," bearing successive diachronic tabulator-generated serial number security parameters designated "snk, snk+1," bearing diachronic time of feed security parameters designated "tdsk, tdsk+1," and bearing diachronic running vote count tabulation security parameters respectively designated "rck(race X tab 10)" and "rck+1(race X tab 9)," where "tab" represents tabulation. An exemplary diachronic running counts out-of-sync parameter violation would be indicated for the corresponding ballot image files 192, 194 should the difference in the running count tabulation for any race or matter between successive ballots not equal zero (0) or plus one (1). In any contest, the corresponding out-of-sync ballot image files 192, 194 could be readily identified and audited for authentication and possible invalidation.

Many modifications and embodiments will become apparent to those of skill in the art having benefitted by the disclosure of the present invention without departing from the inventive concepts.

Voter sign-in sheets at the poll constitute an additional security parameter, as they are the official record of who was registered to vote, who did vote, on what day they voted, and who did not vote. An element to empower the electorate and other interested parties in carrying out an audit of the results is by way of providing the voter sign-in information, preferably in the form of an image file recorded from each sign-in sheet, and as a series of image files formatted for viewing frame by frame, that may be accomplished using the same equipment used to scan the ballots. The series of sign-in sheets may be broadcast or posted or otherwise provided to auditors and election officials, for the purpose of correlation with the enhanced ballot image record. By making sign-in sheets and ballots both available for analysis together, several data security checks are realized by way of spot checking.

The total number of ballots should match the total number of voters who signed in to vote. Registered voters who didn't vote can verify that they are indicated on the sign-in sheet as having not voted, rather than their potential vote having become the place-holder for a counterfeit ballot. The public may peruse the list of voters for dead people, felons, and people who don't exist, or are listed several times. Those who did vote can search the ballot image series files for their own ballot serial number which they recorded while in the ballot booth, and verify that the marks on the ballot of record are in fact the marks they made, and were tabulated correctly, and that their vote was added to the tally from the previous ballot, and was carried over to the following enhanced ballot image file's tabulation.

Voter sign-in sheets may be designed so as to fit the ballot tabulation equipment, so that the paper handling, imaging function, cast vote discrimination function, running count cast vote tabulation function and broadcast and publishing functions of the tabulator equipment may be accomplished by one machine, and used for the purpose of distributing the voter sign-in sheet images to the public contemporaneously with the enhanced security ballot image files and/or records. The smaller number of sign-in sheets could be broadcast or published prior to the larger number of enhanced security ballot image files and/or record and their tabulation. Summary data read from the sign-in sheets may be appended as a data file, or image file, or made searchable through OCR or summaries from OCR derived data analysis of the sign-in sheet images.

It will be readily appreciated by those of skill in the art that the enhanced security ballot image tabulator of the present invention and its feeder, imager, analyzer and compiler modules cooperative to provide enhanced security ballot image records of constitutive ballot image files each for another ballot of the serially processed ballots of the plurality of ballots to be tabulated having diachronically and synchronically coordinated security parameters may be variously embodied without departing from the inventive concepts including for example a suitably programmed smart phone, tablet, or phablet with imaging, enhanced security ballot image processing and enhanced ballot image record compiling functions. The enhanced security ballot image audit station and its constitutive receiver, controller, I/O interface and display cooperative to scroll enhanced-security ballot image records and constitutive files and to scan the record for enhanced-security files having out-of-sync diachronic and/or synchronic parameters and/or other security or other parameters may also be variously embodied without departing from inventive concepts.

The principles of the present invention will have applications in many different voting systems employing paper or other tangible ballots without departing from the inventive concepts.

What is claimed is:

1. An enhanced security ballot image tabulator providing from a plurality of ballots to be tabulated an enhanced security ballot image record constituted by a plurality of enhanced security ballot image files each corresponding to another one of the plurality of ballots to be tabulated, comprising:

a serial ballot feeder module adapted to serially feed at a feed rate each ballot of said plurality of ballots to be tabulated one after the other, each at a date and feed time that defines each said ballot's unique time and date of feed, and each with another unique serial number that depends on each said ballot's respective position in the sequence of said serially fed ballots of said plurality of ballots to be tabulated;

a ballot image module operatively coupled to said serial ballot feeder adapted to serially process each ballot of the plurality of ballots to be tabulated and to serially provide a plurality of ballot images thereof each corresponding to another ballot of said serially fed ballots, each at each said ballot's said unique time and date of feed and each with another said unique serial number;

a ballot image analyzer module coupled to the ballot image module adapted to serially recognize whether or not the serially provided ballot images have races or matters having cast votes and to serially tabulate a plurality of cumulative running counts of the races or matters of the ballot images having recognized cast votes current with each said ballot image of said serially fed ballots of said plurality of ballots to be tabulated;

a record compiler module coupled to said feeder, said image and said analyzer modules adapted to serially provide a plurality of enhanced security ballot image files, that respectively include, for each ballot of said plurality of ballots to be tabulated, each said ballot's corresponding ballot image, each said ballot's unique time and date of feed, each said ballot's unique serial number, and each said ballot's cumulative running votes cast tabulation, and to compile an enhanced security ballot image record that is constituted by said enhanced security ballot image files, each for another one of said serially fed ballots of said plurality of ballots to be tabulated, each at each said ballot's said unique time and date of feed and each with another said unique serial number; and a memory for storing said enhanced security ballot image record that is constituted by said enhanced security ballot image files, each for another one of said serially fed ballots of said plurality of ballots to be tabulated.

2. The enhanced security ballot image tabulator of claim 1, wherein said enhanced security ballot image record is compiled to provide sequential viewing of said enhanced security ballot image record's constitutive enhanced security ballot image files, and further including a broadcast module for broadcasting said enhanced security ballot image record.

3. The enhanced security ballot image tabulator of claim 2, wherein said enhanced security ballot image record includes metadata.

4. The enhanced security ballot image tabulator of claim 3, wherein said metadata is formatted in Exif format.

5. The enhanced ballot image tabulator of claim 2, wherein said enhanced security ballot image record is simulcast simultaneously for public view with the serial processing of each said constitutive enhanced security ballot image file respectively corresponding to another one of said plurality of ballots to be tabulated.

6. The enhanced security ballot image tabulator of claim 1, further including a camera operatively connected to said record compiler adapted to serially provide a preselected image synchronous with each said serially provided ballot images, wherein said record compiler is further adapted to include said preselected image synchronous with each said serially provided ballot images as a constitutive part of each said ballot's corresponding enhanced security ballot image file.

7. The enhanced security ballot image tabulator of claim 1, further including an enhanced security audit station adapted to receive said enhanced security ballot image record and to selectively scan its constitutive enhanced security ballot image files for selected out-of-bounds parameters.

8. The enhanced security ballot image tabulator of claim 7, wherein said selected out-of-bounds parameters are diachronic security parameters representative of one of said time and date of feed, said serial number, and said running votes cast tabulation.

9. The enhanced security ballot image tabulator of claim 7, further including a camera for providing an image, wherein said record compiler is further adapted to serially provide an enhanced security ballot image file that includes an image provided by said camera for each ballot of the plurality of ballots to be tabulated, and wherein said selected out-of-bounds parameters is a synchronous security parameter representative of said image.

10. The enhanced security ballot image tabulator of claim 1, wherein said memory is a secure memory.

* * * * *